United States Patent
Touahri et al.

(10) Patent No.: US 12,498,268 B2
(45) Date of Patent: Dec. 16, 2025

(54) ELIMINATION OF OPTICAL GHOSTS IN OPTICAL SPECTRAL ANALYZERS THROUGH A SCANNING SPECTRAL FILTER

(71) Applicant: VIAVI SOLUTIONS INC., Chandler, AZ (US)

(72) Inventors: Driss Touahri, Nepean (CA); Luis Andre Neves Paiva Fernandes, Maia (PT)

(73) Assignee: VIAVI SOLUTIONS INC., Chandler, AZ (US)

( * ) Notice: Subject to any disclaimer, the term of this patent is extended or adjusted under 35 U.S.C. 154(b) by 149 days.

(21) Appl. No.: 18/343,469

(22) Filed: Jun. 28, 2023

(65) Prior Publication Data
US 2025/0003798 A1    Jan. 2, 2025

(51) Int. Cl.
*G01J 3/18* (2006.01)
*G01J 3/02* (2006.01)
*G01J 3/12* (2006.01)
*G01J 3/28* (2006.01)

(52) U.S. Cl.
CPC .............. *G01J 3/18* (2013.01); *G01J 3/0208* (2013.01); *G01J 2003/1247* (2013.01); *G01J 2003/2843* (2013.01)

(58) Field of Classification Search
CPC .... G01J 3/18; G01J 3/0208; G01J 2003/2843; G01J 2003/1247
See application file for complete search history.

(56) References Cited

U.S. PATENT DOCUMENTS

| | | | | |
|---|---|---|---|---|
| 6,147,821 | A * | 11/2000 | Kadokura | G02B 1/11 359/585 |
| 2006/0038995 | A1* | 2/2006 | Chrisp | G01J 3/2823 356/328 |
| 2007/0171415 | A1* | 7/2007 | Chrisp | G01J 3/2823 356/328 |
| 2021/0325245 | A1* | 10/2021 | Touahri | G01J 3/0291 |

FOREIGN PATENT DOCUMENTS

| | | | | |
|---|---|---|---|---|
| EP | 0119356 | A1 * | 12/1983 | G01B 11/08 |
| JP | 2001023223 | A * | 1/2001 | |

OTHER PUBLICATIONS

Jeremy M. Lerner, "Approaches to Spectral Imaging Hardware", Jul. 2010 (Year: 2010).*
Standa, "Motorized Mirror Mounts", https://www.youtube.com/watch?v=ul8zUvy9opo May 14, 2014 (Year: 2014).*

* cited by examiner

*Primary Examiner* — Maurice C Smith
(74) *Attorney, Agent, or Firm* — Mannava & Kang, P.C.

(57) ABSTRACT

A monochromator apparatus in a grating-based optical spectrum analyzer (OSA) includes a diffraction grating, a reflector element, and a tunable spectral filter. The tunable spectral filter may include a band-pass filter, a low-pass filter, a high-pass filter, or a linear variable filter, for example. A spectral window of the filter may move synchronously with the scanning spectral window of the OSA. A high-pass filter implementation may be introduced during a subsequent portion of the OSA window before the optical ghost signal starts appearing. The filter may either be linearly scanned across the optical beam, angularly tuned, or introduced in a subsequent portion of the OSA scanning window.

20 Claims, 10 Drawing Sheets

ELIMINATION OF OPTICAL GHOSTS IN OPTICAL SPECTRAL ANALYZERS THROUGH A SCANNING SPECTRAL FILTER

TECHNICAL FIELD

This patent application is directed to optical measurement instrumentation, and more specifically, to a gratings-based optical spectrum analyzer (OSA) using a scanning spectral filter to reduce or eliminate optical ghosts for improved resolution.

BACKGROUND

An optical spectrum analyzer extends the principles of spectrum analysis to the optical realm that are traditionally performed for the radio frequency (RF) spectrum by measuring important wavelength, power, and optical signal to noise ratio and other noise characteristics of light waves. Optical spectrum analyzers are often used in scientific research and for testing long haul, access networks, and data center interconnect fiber links with high channel counts, strict signal to noise requirements, and coherent technology enabling high speed transmission. For example, a fiber optic communication network utilizing wavelength division multiplexing (WDM) to allow multiple optical carrier signals to be carried over a single fiber is an application for the use of an optical spectrum analyzer.

There are many types of optical spectrum analyzers such are Fabry-Perot-based, interferometer-based and swept coherent heterodyne optical spectrum analyzers. However, the most common optical spectrum analyzers are diffraction grating based, known also as monochromator based optical spectrum analyzers. One challenge associated with grating-based optical spectrum analyzers is the presence of optical ghosts that are spurious spectral features generated at different spectral locations from the main signals. Eliminating spectral ghosts becomes even more challenging in compact optical spectrum analyzers.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
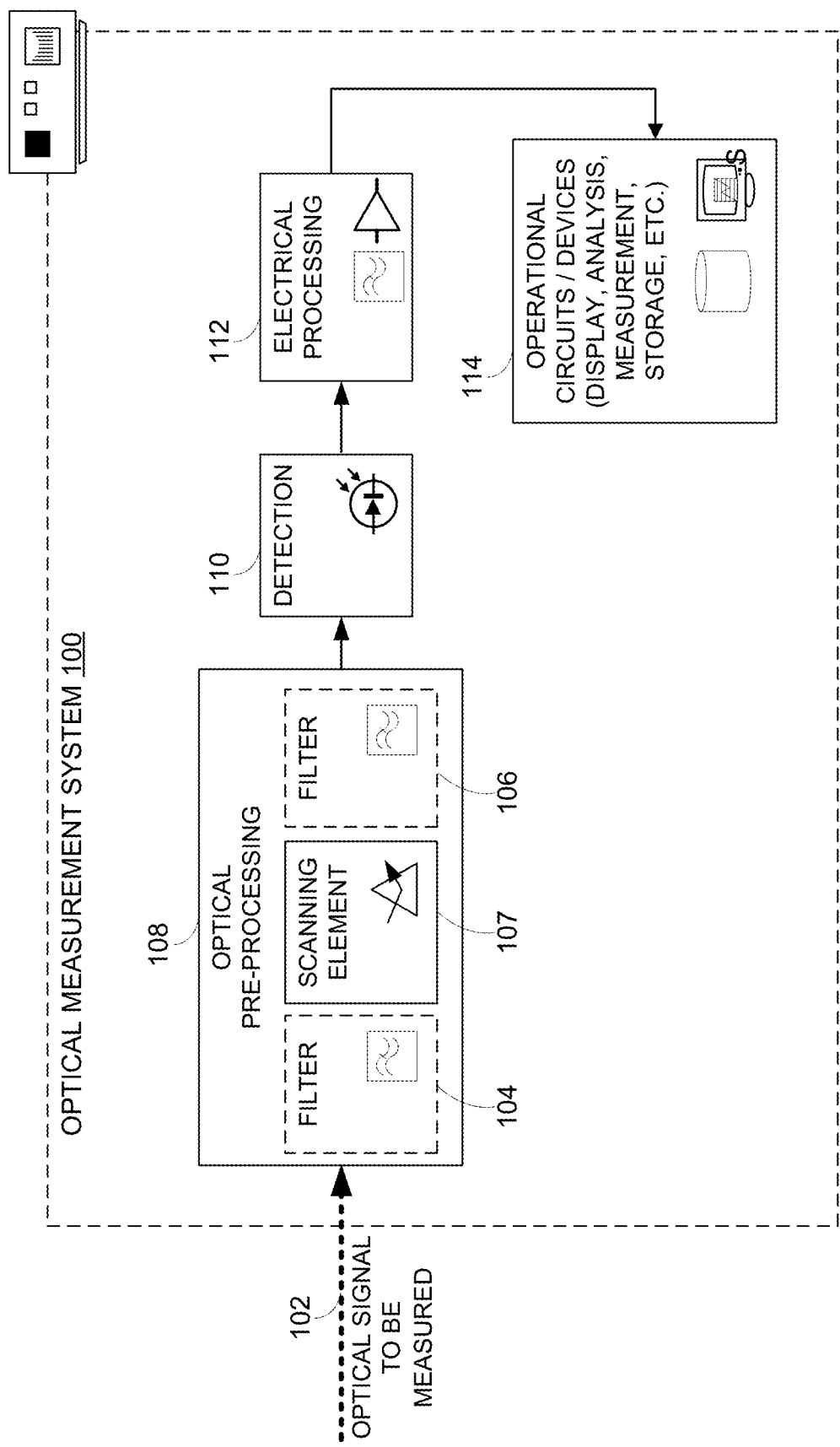
FIG. 1 illustrates a block diagram of an optical measurement system, such as an optical spectrum analyzer, which may include a scanning spectral filter to reduce or eliminate optical ghosts for improved resolution as part of its front-end, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In a monochromator (diffraction grating) based optical spectrum analyzer, for example, a broadband light input signal may strike a diffraction grating. When this happens, a thin space between every two adjacent lines of the diffraction grating may become an independent "source," which may then diffract light off into a range of wavelet angles. For each wavelength and each specific angle, the diffracted wavelets may be generated at exactly one wavelength out of phase with one another, and may therefore add together constructively. In other words, light with a given wavelength may leave the diffraction grating at a specific angle. Also, the wider an illuminated portion of the diffraction grating, the higher the number of diffracted wavelets there may be, and therefore the narrower the diffracted beam pattern may become. This may enable a spectral resolution of the monochromator based optical spectrum analyzer to be proportional to the size of the illuminated portion of the diffraction grating.

As mentioned herein, diffraction grating-based optical spectrum analyzers may present optical ghosts that are spurious spectral features generated at different spectral locations from the main signals. Optical ghosts may propagate on a secondary path through the system that occurs at a different angle of the scanning element than the main signal. As a result, a copy of a spectral line may appear at a different spectral location that corresponds to that secondary scanning angle.

According to an example of the present disclosure, optical beams that cause ghost effects may be reduced or eliminated in grating-based optical spectrum analyzers (OSAs) by use of a tunable spectral filter while allowing a main signal to be analyzed. The tunable spectral filter may include a band-pass filter, a low-pass filter, a high-pass filter, or a linear variable filter, for example. In some examples, a spectral window of the filter may move synchronously with the scanning spectral window of the OSA. A high-pass filter implementation may be introduced during a subsequent portion of the OSA window before the optical ghost signal starts appearing. The filter may either be linearly scanned across the optical beam, angularly tuned, or introduced in a subsequent portion of the OSA scanning window.

Some advantages and benefits of the systems and methods described herein are readily apparent. For example, optical ghost signals may be eliminated without compromising an optical performance of an OSA. Stray light that may be generated by multiple reflections from a prism reflector element may also be reduced. Through the tunable spectral filter, a shorter propagation path may be achieved with the unwanted reflections removed. The shorter propagation path may allow for the components to be closer together, allowing a smaller overall size for the OSA. Other benefits and advantages may also be apparent.

FIG. 1 illustrates a block diagram of an optical measurement system 100, such as an optical spectrum analyzer, which may include a scanning spectral filter to reduce or eliminate optical ghosts for improved resolution as part of its front-end, according to an example. The optical measurement system 100 for example is a monochromator-based optical spectrum analyzer. The optical measurement system 100 may receive an optical input signal 102 to be measured from an optical source, for example, a fiberoptic cable, and include an optical pre-processing block 108, a detection block 110, an electrical processing block 112, and operational circuits and devices 114. The optical pre-processing block 108 may include a scanning element 107 and one or more filters 104, 106.

In some examples, the filters 104, 106 may be used to filter a main signal, but one or both of the filters 104, 106 may also be scanning spectral filters and be used to reduce or eliminate optical ghosts that may reduce a resolution of the optical measurement system 100. The scanning spectral filters may be positioned before the scanning element 107, after the scanning element 107, or both. In an operation, the optical input signal 102 to be measured may be pre-processed at the optical pre-processing block 108 and provided to the detection block 110, which may include a detection element, for example, a photodiode. The detection block 110 may provide an electrical signal derived from the optical input signal to be measured to the electrical processing block 112, where the electrical signal may be amplified, filtered, up- or down-converted, converted to a digital signal, or similarly processed. The output of the electrical processing block 112 may be provided to the operational circuits and devices 114, which may include a display driver, a storage device, a digital signal processor, and other comparable circuits and devices.

In pre-processing the optical input signal, the optical measurement system 100 may select individual wavelengths for measurement. Various techniques may be used to a wavelength for measurement. One example is a diffraction grating monochromator. To determine the power for an individual wavelength, the diffraction grating method may utilize a rotating filter or "grating" inside the optical spectrum analyzer (optical measurement system 100). Different wavelengths may be presented to a photodetector sequentially as the grating rotates. In such systems, a motor may drive the diffraction grating. For any given angle of the rotating grating, a small band of the input spectrum may be aligned with an output slit, which may be composed of an optical fiber that serves as an output coupler. In some examples, the output fiber may guide an output optical beam into a detection system (e.g., photodetector system), which may be composed of various opto-electrical elements, such as photodiodes, amplifiers, and/or analog-to-digital converters (ADCs). The detection system, among other things, may measure power as function of reflector angle, which in turn may correspond to a function of wavelength. This method is known for accommodating a wide spectral range and producing accurate readings.

In grating-based OSAs, optical ghost signals are spurious spectral lines that propagate on a secondary path through the system that occur at a different angle of the scanning element than a main signal. As a result, a copy of a spectral line may appear at a different spectral location that corresponds to the secondary scanning angle. This location may usually be on the higher end of the spectrum compared to the main signal. OSAs are designed such that the main signal beam makes it through the optical system by striking the scanning element (mirror, set of mirrors, prism, set of prisms, etc.) at an exact number of times. Optical ghost signals may hit the scanning element a different number of times (usually a higher number of times) than the main signal beam. Depending on a wavelength range of the OSA and aperture of the optical elements used in the system, there may exist a multitude of additional paths that can generate optical ghost signals.

In some examples, a tunable spectral filter may be used to avoid detection of the optical ghost signal(s) along with the main signal. A spectral window of the filter may be moved synchronously with the scanning spectral window of the OSA. A high-pass filter implementation may be introduced during a subsequent portion of the OSA window before the optical ghost signal starts appearing. The filter may either be linearly scanned across the optical beam, angularly tuned, or introduced in a subsequent portion of the OSA scanning window.

In some examples, the optical measurement system 100 may be a Fabry-Perot-based OSA, an interferometer-based OSA, a swept coherent heterodyne OSA, or comparable measurement system. It should be appreciated that the block diagram of the optical measurement system 100 in FIG. 1 is a block diagram showing major components of the optical measurement system 100. A measurement or similar test/monitoring system may be implemented with additional of fewer components, where certain functionality may be distributed among various components and sub-systems or performed by additional components or sub-systems using the principles described herein.

Figure 2A:
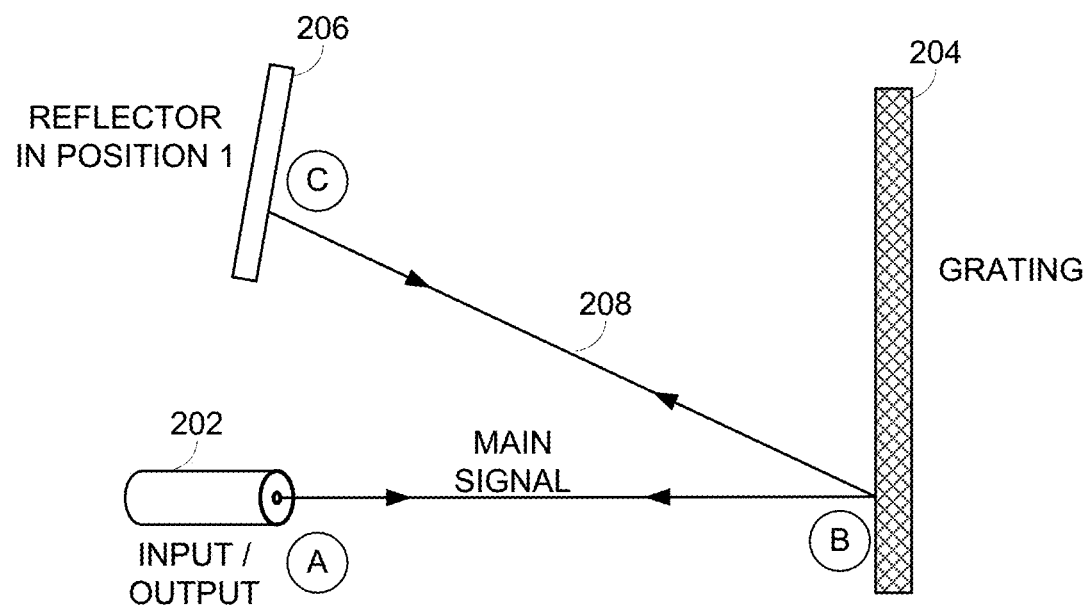
FIG. 2A illustrates example paths of a main signal in a dual-pass diffraction grating-based optical pre-processing system, according to an example.

FIG. 2A illustrates example paths of a main signal 208 in a dual-pass diffraction grating-based optical pre-processing system, according to an example. As shown in diagram 200A, an optical signal (main signal 208, also referred to as main optical beam) with multiple wavelengths (e.g., a broadband beam) may be provided by an input/output element 202 onto a grating 204. The input/output element 202 may be any component that provides an optical signal (beam) onto the grating 204 and receives diffracted (and reflected) signal back. In practical implementations, the input/output element 202 may be two distinct components (e.g., an entrance slit and an exit slit). For simplicity purposes, the input and output elements are shown here as a single input/output element 202.

In some examples, the main signal 208 passing through the input/output element 202 may be provided by the optical source in FIG. 1. The grating 204 may diffract the main signal 208 and provide one or more beams to a retroreflective element (reflector element 206), which may reflect the beam(s) back to the grating 204, from where further diffracted beam(s) may be provided to the output element or exit slit. The reflector element 206 may be implemented in a variety of ways, for example, using a right-angle prism, a flat mirror, a set of prisms, a set of mirrors, etc. In some examples, one or both of the grating 204 and the reflector element 206 may be rotatable.

In an operation, the main signal 208 may follow an initial path from point "A" at the input or entrance slit to point "B" on a surface of the grating 204. The diffracted main signal 208 may then follow from point "B" to point "C" on a surface of the reflector element 206, which may be in a first position. The first position of the reflector element 206 may be selected to correspond to a diffraction characteristic of the grating 204 such that the main signal 208 reflected by the reflector element 206 may follow the path from point "C" back to point "B". The main signal 208 may be diffracted for a second time (hence, "dual-pass") on the surface of the grating 204 and directed along the same path from point "B" to point "A" arriving at the input/output element 202.

It should be appreciated that one or more additional optical elements may also be provided. For example, a light source (not shown) may be provided upstream of the input or entrance slit to generate the main signal 208 (e.g., a broadband beam, white light, etc.). A detection system (not shown) may also be provided downstream of the output element or exit slit to collect and measure the diffracted main signal 208. Other optical elements may also be provided. In some examples, a mirror to reflect the reflected diffracted optical beam back to the reflector element and the grating element may be included. The mirror may be offset to align the output optical beam with the output element. In other examples, a focus element such as one or more collimators or lenses may be provided between entrance/exit slit and the grating 204 to collimate or focus the main signal 208 as needed.

In some examples, the grating 204 may be a diffraction grating. As such, the diffraction grating may be an optical component with a periodic structure of diffractive elements that split or diffract light into separate beams, which may be transmitted as diffracted signals and travel in different directions. In some examples, the diffraction grating may be a ruled, holographic, or other similar diffraction grating. The grating 204 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating 204 may also be made from a variety of materials. This may include any number of isotropic materials. In some examples, the grating 204 to be used in optical measurement system 100 may be selected based on any number of factors to optimize a resolution of the OSA. This may include factors, such as efficiency, blaze wavelength, wavelength range, stray light, resolving power, etc.

The reflector element 206 may include any number of configurations to provide retroreflection or other similar function. For example, the reflector element 206 may be a prism reflector element, a flat mirror, or a mirror and lens combination. In some examples, the mirror may be a convex mirror and the lens may be a focusing lens. It should be appreciated that other reflectors, configurations, or combinations of such elements or configurations, may also be provided.

As shown in the diagram 200A, the main signal 208 may travel from optical element to optical element. In this case, the main signal 208 may pass through the same grating 204 two times between the input component or entrance slit and the output element or exit slit, the multi-pass monochromator based optical spectrum analyzer of optical measurement system 100 may be referred to as a dual-pass (2-pass) monochromator based optical spectrum analyzer that is able, by design, to achieve high resolution optical measurements. In some example, additional retroreflective elements (e.g., mirrors) may be used for a four-pass (4-pass) or higher order optical spectrum analyzer.

Figure 2B:
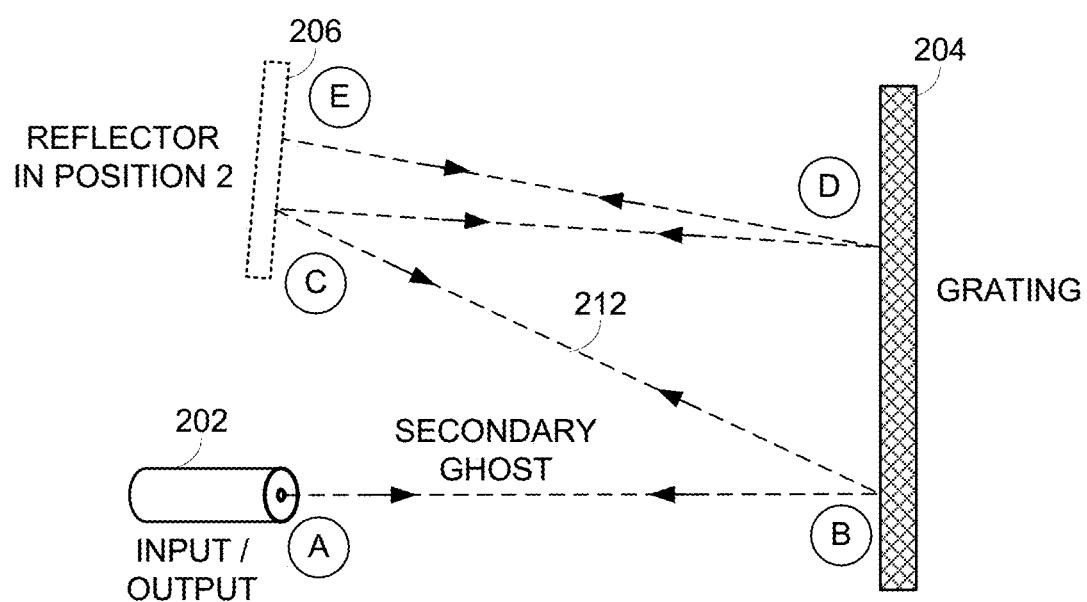
FIG. 2B illustrates paths of secondary optical ghosts that may be generated in a diffraction grating-based optical pre-processing system, according to an example.

FIG. 2B illustrates paths of secondary optical ghosts that may be generated in a diffraction grating-based optical pre-processing system, according to an example. As shown in diagram 200B of FIG. 2B, a ghost signal 212 may be created by a diffraction of the main signal being reflected by the reflector element 206 (in a second position different from the first position) back to the grating 204, getting diffracted back to the reflector element 206 along the same path, and then following the path as the main signal to the input/output element 202.

In some examples, depending on a wavelength range of the optical spectrum analyzer and an aperture of the optical elements used in the system, there may exist a multitude of additional paths that can generate optical ghosts. For a given grating order, the spectral location of the optical ghosts with respect to the main signal may depend on the diffraction grating groove density as well as on the incidence angle.

Figure 3:
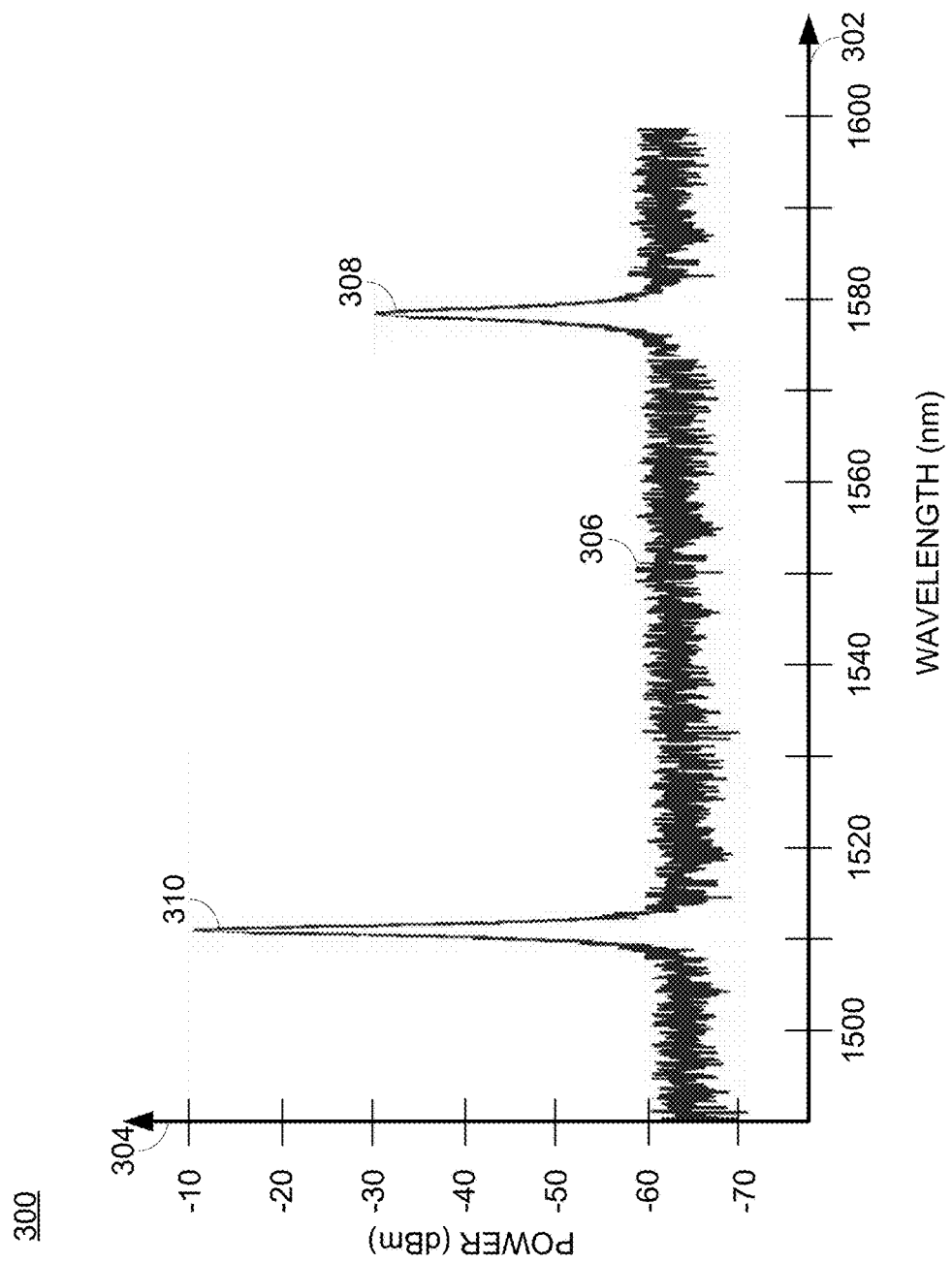
FIG. 3 illustrates an optical spectrum analyzer screenshot showing the main signal and an optical ghost, according to an example.

As mentioned herein, the main signal beam passes through the optical system by striking the scanning element (reflector element 206) at an exact number of times. Optical ghost signals may hit the scanning element a different number of times (usually a higher number of times) than the main signal beam. Depending on a wavelength range of the OSA and aperture of the optical elements used in the system, there may be multiple additional paths that can generate the optical ghost signals. As shown in FIG. 2A, the main signal may follow a normal path where it is diffracted by the grating 204 towards the reflector element 206 (in first position), which then retro-reflects the main signal 208 back at normal incidence. However, when the reflector element 206 is rotated (second position) as shown in diagram 200B, the beam as diffracted from the grating 204 is no longer normal to the reflector element 206 and is then reflected away from the path of the signal between points "C" and "D". As a result, the beam at point "D" may be "retro-diffracted" back to the reflector element 206. This may cause the ghost signal 212 to be colinear with the main signal 208 towards the exit slit. Because the reflector angle for this ghost signal 212 is different than that of the main signal 208, the ghost signal 212 may appear as a spectral copy of the main signal 208 but at a different wavelength as shown in FIG. 3. The ghost signal's spectral location may depend on the grating groove density, the angle of incidence, and the wavelength. The spectral location may be mapped across the entire wavelength range using a grating equation for the grating 204.

As shown in FIG. 2B, the ghost signal 212 may be reflected to point "E" on the reflector element 206 (in second position) from point "D" on the grating 204 and be reflected back to the grating following the same path back ("D" to "C" to "B" to "A"). Thus, while the main signal goes through two passes on the grating, the ghost signal 212 may go through four passes and arrive at the exit slit colinear with the main signal 208.

The grating 204 may be an optical component with a periodic structure that separates (disperses) polychromatic light into its constituent wavelengths (colors), in other words, splits or diffracts light into separate beams that may also travel in different directions. The dispersion may arise from wavefront division and interference of incident beam from a periodic structure of the grating. The grating 204 may include equally spaced parallel grooves, formed on a reflective coating and deposited on a substrate. A shape of the grooves (i.e., blaze angle) may influence which wavelength range the grating may be optimized for. In some examples, the grating 204 may be a ruled, holographic, or other similar diffraction grating. The grating 204 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating 204 may be made from a variety of materials such as any number of isotropic materials.

After an incident light beam (wave) interacts with the grating 204, the resulting diffracted light from the grating 204 may include a sum of interfering wave components emanating from each groove in the grating. At any given point in space through which the diffracted light may pass (observation point), a path length from each groove in the grating 204 may vary. Thus, a phase of the wave emanating from each of the grooves at that point may also vary. For light at a normal incidence to the grating 204, intensity maxima may occur at diffraction angles $\theta_m$, which may satisfy the expression:

$$d^* \sin \theta_m = m\lambda, \quad (1)$$

where θm is the angle between the diffracted beam and the diffraction grating's normal vector, λ is the wavelength, d is a distance from the center of one groove to the center of another adjacent groove (i.e., periodicity distance), and m is an integer representing the propagation-mode of interest called the diffraction order.

For the incident beam (e.g., $\lambda_M$), the with an incidence angle $\theta_i$ (the angle between the incident beam and the grating's normal vector), the expression (1) may be provided as:

$$\sin \theta_i + \sin \theta_m = m\lambda/d. \quad (2)$$

Thus, for $0^{th}$ order (m=0), the diffraction grating may behave like a wavelength independent mirror, where $\theta_i = \theta_m$.

Again, this derivation of the grating equation may be based on an idealized grating element. However, the relationship between angles of the diffracted beams, grating spacing, and/or wavelength of the light may apply to any regular structure of the same spacing because phase relationship between light scattered from adjacent elements of the grating may generally remain the same. The detailed distribution of diffracted light may therefore depend on a detailed structure of the grating element(s) as well as on the number of elements in the grating structure, but it may typically provide maxima in the directions given by the grating equation.

It should be appreciated that the diffraction grating based monochromator and reflector element discussed herein may be implemented with various configurations using fewer or additional elements implementing the principles described herein. The configurations shown in diagrams 200A-200D are intended as illustrative examples.

FIG. 3 illustrates an optical spectrum analyzer screenshot 300 showing the main signal 310 and an optical ghost signal 308, according to an example. Screenshot 300 shows across wavelength axis 302 (nm) and power axis 304 (dBm), a captured signal that includes noise 306 and two peaks: main signal 310, optical ghost signal 308. Table 1 below shows examples of main signal and corresponding ghost signal wavelengths in nanometers.

TABLE 1

Example main signal and corresponding ghost signal wavelengths

| Ghost | Main |
|---|---|
| 1444.495 | 1250.000 |
| 1450.000 | 1257.363 |
| 1460.000 | 1270.745 |
| 1470.000 | 1284.137 |
| 1480.000 | 1297.539 |

TABLE 1-continued

Example main signal and corresponding ghost signal wavelengths

| Ghost | Main |
|---|---|
| 1490.000 | 1310.951 |
| 1500.000 | 1324.371 |
| 1510.000 | 1337.801 |
| 1520.000 | 1351.241 |
| 1530.000 | 1364.688 |
| 1540.000 | 1378.144 |
| 1550.000 | 1391.609 |
| 1560.000 | 1405.082 |
| 1570.000 | 1418.563 |
| 1580.000 | 1432.052 |
| 1590.000 | 1445.549 |
| 1600.000 | 1459.054 |
| 1610.000 | 1472.567 |
| 1620.000 | 1486.087 |
| 1630.000 | 1499.614 |
| 1641.000 | 1513.149 |
| 1650.000 | 1526.619 |

As mentioned herein, the optical ghost signal's spectral location may depend on the grating groove density, the angle of incidence, and the wavelength. The spectral location may be mapped across the entire wavelength range using a grating equation for the grating. Depending on the same parameters, an amplitude of the optical ghost signal 308 may also be higher or lower than the illustrated example. A challenge in controlling these spurious reflections may be exacerbated when the optical components are closer together in a compact/smaller form factor optical spectrum analyzer. scanning spectral filter element as described in FIGS. 4A-4D may reduce or eliminate these reflections.

FIGS. 4A-4D illustrate various example configurations and placement of a scanning spectral filter to reduce or eliminate optical ghosts for improved resolution, according to an example. In some implementations, an oblique triangle prism reflector element may be used to move the ghost reflections away from the main signal path, thereby, avoiding arrival of the ghost signal(s) at an input/output element 402. However, such ghost mitigation approaches may add to a size and weight of the OSA or be impractical in small form factor implementations.

In some examples, optical beams that cause ghost effects may be reduced or eliminated in a grating-based OSA by use of a tunable spectral filter element while allowing a main signal to be analyzed. The tunable spectral filter may include a band-pass filter, a low-pass filter, a high-pass filter, or a linear variable filter, for example. In some examples, a spectral window of the filter may move synchronously with the scanning spectral window of the OSA. A high-pass filter implementation may be introduced during a subsequent portion of the OSA window before the optical ghost signal starts appearing. The filter may either be linearly scanned across the optical beam, angularly tuned, or introduced in a subsequent portion of the OSA scanning window.

Diagram 400A shows one example configuration, where the input/output element 402 provides the main signal beam onto a grating 404, which diffracts the main signal beam onto a reflector element 406. As the reflector element 406 is moved angularly by a motion element 407, ghost signal(s) may be generated passing multiple times between the grating 404 and the reflector element 406. To eliminate or reduce the ghost signal(s), a tunable spectral filter element 408 may be placed in the ghost signal path. The tunable spectral filter element 408 may be moved by a motion element 409, and movements of the reflector element 406 and the tunable spectral filter element 408 may be synchronized (410) by synchronizing the motion element 407 and the motion element 409.

In some examples, the motion elements 407, 409 may be miniature motors, micro-electromechanical systems (MEMS), piezoelectric-based motion elements, or similar ones. The synchronization 410 may be achieved by coordinating control signals of the motion elements 407, 409, for example.

Figure 4A:
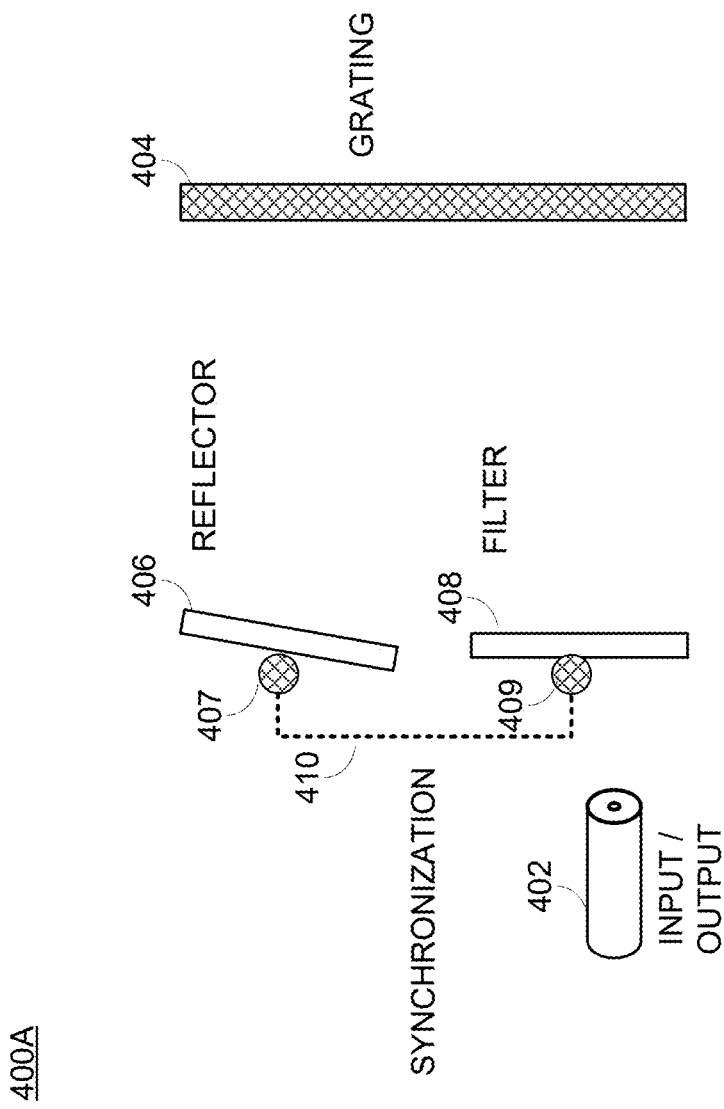
FIGS. 4A-4D illustrate various example configurations and placement of a scanning spectral filter to reduce or eliminate optical ghosts for improved resolution, according to an example.
Figure 4B:
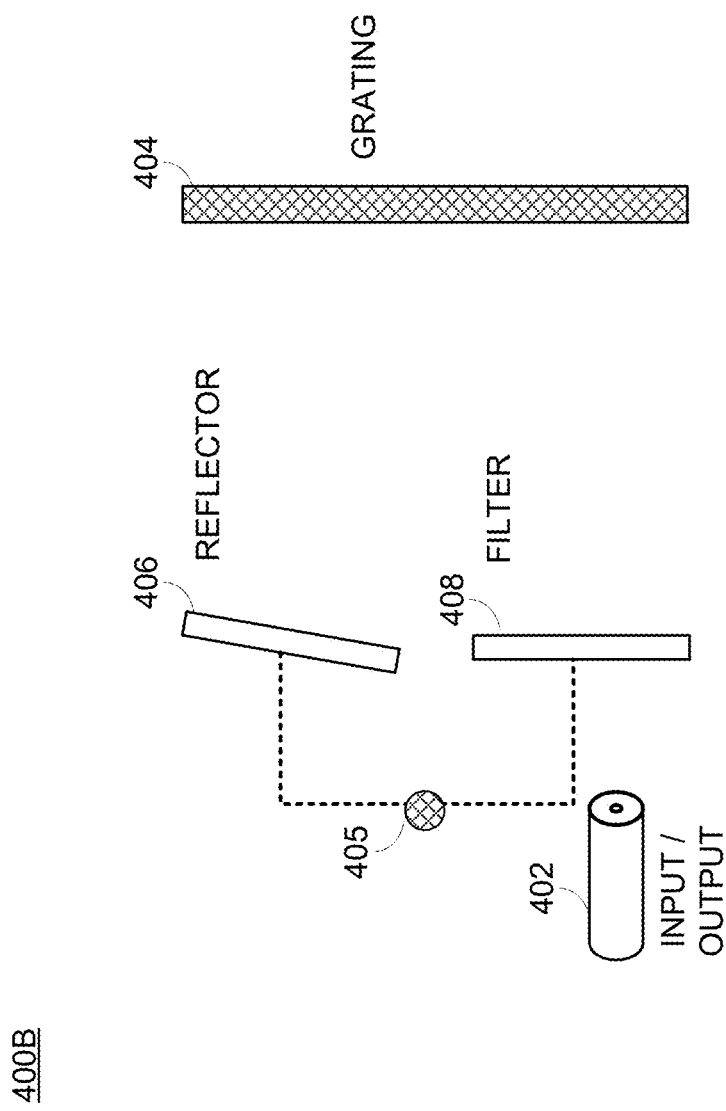

Diagram 400B in FIG. 4B shows another example configuration, where the input/output element 402 provides the main signal beam onto the grating 404, which diffracts the main signal beam onto the reflector element 406. Differently from the diagram 400A, in the example configuration of the diagram 400B, both the reflector element 406 and the tunable spectral filter element 408 are moved by a single motion element 405 to provide synchronization between the reflector element 406 and the tunable spectral filter element 408. Mechanical means (such as extenders, rotators, etc.) may be used to provide connection between the motion element 405 and the reflector element 406, the tunable spectral filter element 408.

In both example configurations of diagrams 400A and 400B, the tunable spectral filter element 408 is placed between the input/output element 402 and the grating 404. Thus, ghost signal beams may be eliminated by the tunable spectral filter element 408 on a return path to output or a source signal for the ghost signal beam may be eliminated (temporally after the main signal beam is captured), for example, by a high pass filter as discussed in further detail below.

Figure 4C:
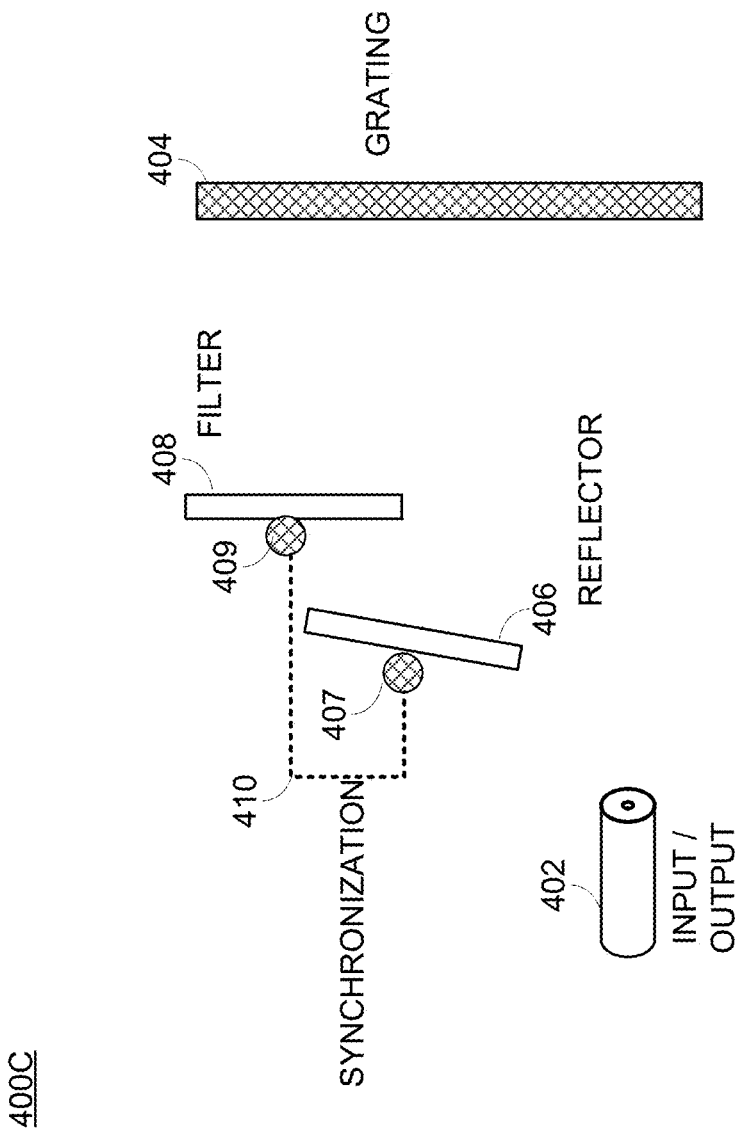

Diagram 400C in FIG. 4C shows yet another configuration, where movements of the reflector element 406 controlled by the motion element 407 and the tunable spectral filter element 408 controlled by the motion element 409 are synchronized to reduce or eliminate ghost signal beams. Differently from the examples configurations in the diagrams 400A and 400B, in the example configuration of the diagram 400C, the tunable spectral filter element 408 is placed on a different path, for examples, a secondary or tertiary return path of the signal from the grating. Thus, the tunable spectral filter element may be placed in different locations to eliminate the ghost signal beam.

Figure 4D:
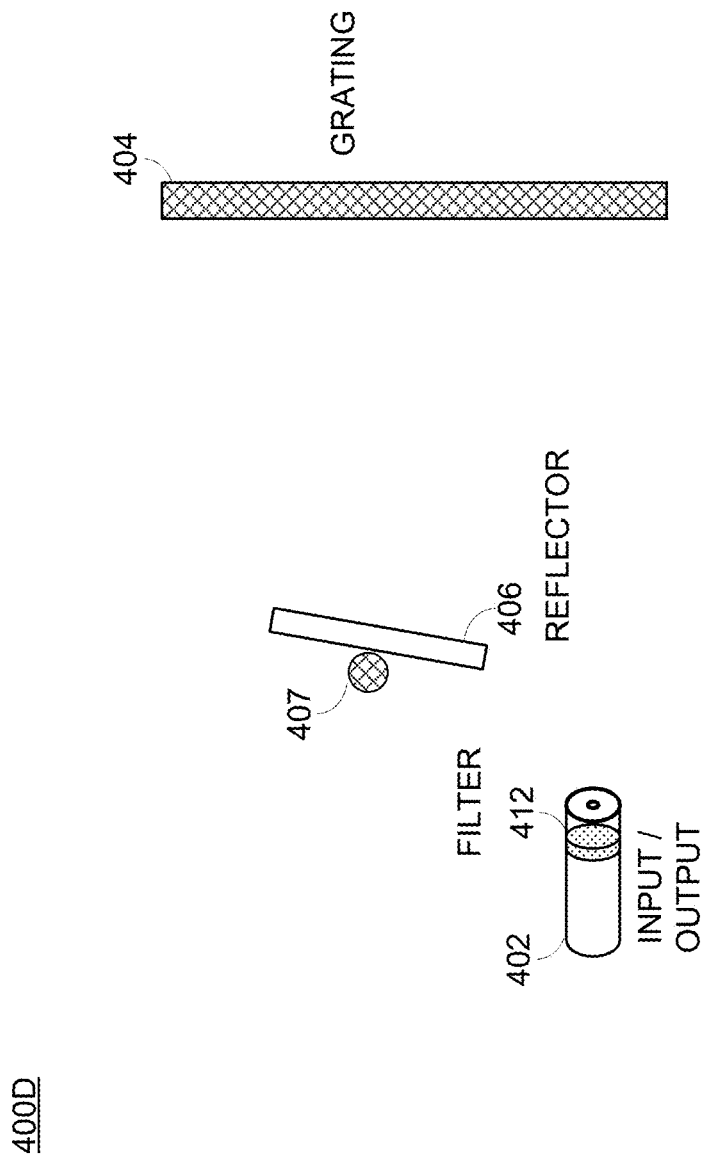

Diagram 400D in FIG. 4D shows a further example configuration, where a tunable spectral filter element 412 may be placed adjacent to or inside the input/output element 402. Thus, the tunable spectral filter element 412 may reduce or eliminate the ghost signal beam at the output or by temporally filtering a source signal (main signal) for the ghost signal beam after it has been captured by the system.

In all of the example configurations, the tunable spectral filter element may be moved linearly or angularly (i.e., rotation) to vary a band of the filter. In some examples, the tunable spectral filter element may be a low-pass filter and its cutoff point may be moved to match the main signal such that the main signal is passed through, while the higher frequency ghost signal(s) are reduced or eliminated. In other examples, the tunable spectral filter element may be a band-pass filter and its pass band may be moved to match the main signal such that the main signal is passed through, while the higher frequency ghost signal(s) are reduced or eliminated.

In further examples, the tunable spectral filter element may be a high-pass filter. While the ghost signals are at higher wavelengths compared to the main signal, the high-pass filter may be tuned or inserted into the path of the main signal after it has been captured by a detection element of the OSA so that the ghost signal created by the diffraction of the main signal is reduced or eliminated before it finds its way back to the output element (or detector).

Although the examples described herein are directed to these various configurations in diagrams 400A-400D, it should be appreciated that other reflector element or retroreflective element configurations, filter elements, motion elements, or combinations of such configurations, may also be provided.

Figure 5:
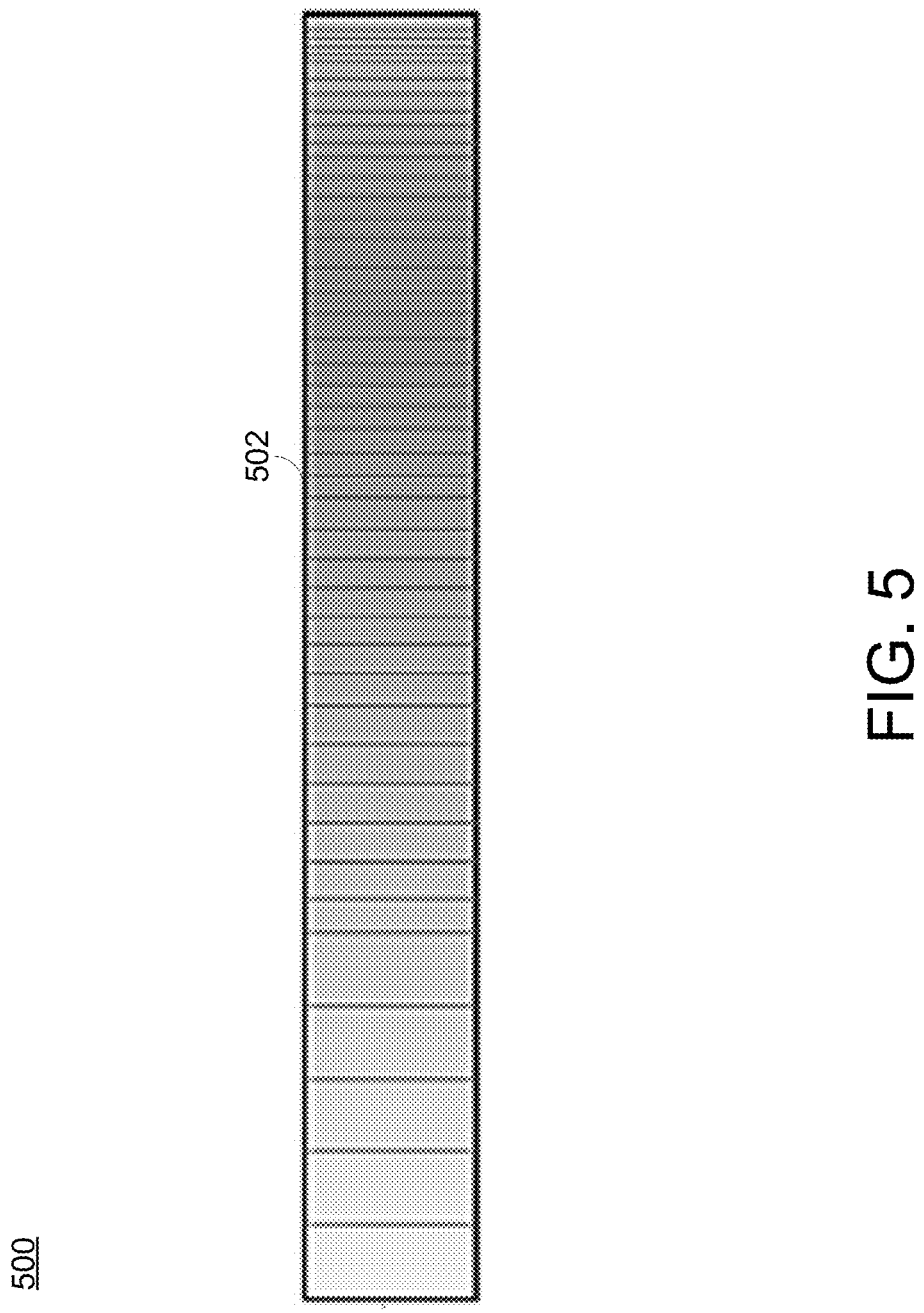
FIG. 5 illustrates an example implementation of a position-dependent spectral filter, according to an example.

FIG. 5 illustrates an example implementation of a position-dependent spectral filter, according to an example. A tunable spectral filter as discussed herein may be implemented in a variety of ways. Diagram 500 shows an example implementation in form of a coated glass filter 502. In some examples, a glass or similar (e.g., polymer, polycarbonate, etc.) substrate may be coated with a material whose filtering characteristics may vary depending on a position along the substrate. For example, at one end of the coated glass filter 502, lower wavelengths may be attenuated, while at the other end of the coated glass filter 502, higher wavelengths may be attenuated. Thus, by moving the coated glass filter 502 across the beam path, different wavelengths (for the ghost signal) may be filtered.

While the coated glass filter 502 is shown in rectangular shape, any other shape or form (e.g., circular, elliptical, etc.) with different variations of filtering characteristics may be used in example implementations. For example, a circular filter may have its coating arranged such that the filtering characteristics (wavelength-dependent attenuation) vary angularly along a surface of the filter. The circular filter may then be rotated across the beam path to filter out the ghost signal(s). Thus, the filter may either be linearly scanned across the optical beam, angularly tuned, or introduced in a subsequent portion of the OSA scanning window.

While specific configurations such as the arrangements of a number of components (e.g., diffraction grating, reflector element, etc.) are shown in conjunction with the monochromator systems herein, the illustrated configurations are not intended to be limiting. A tunable spectral filter based diffraction grating monochromator may be implemented with other configurations and component values using the principles described herein.

Figure 6:
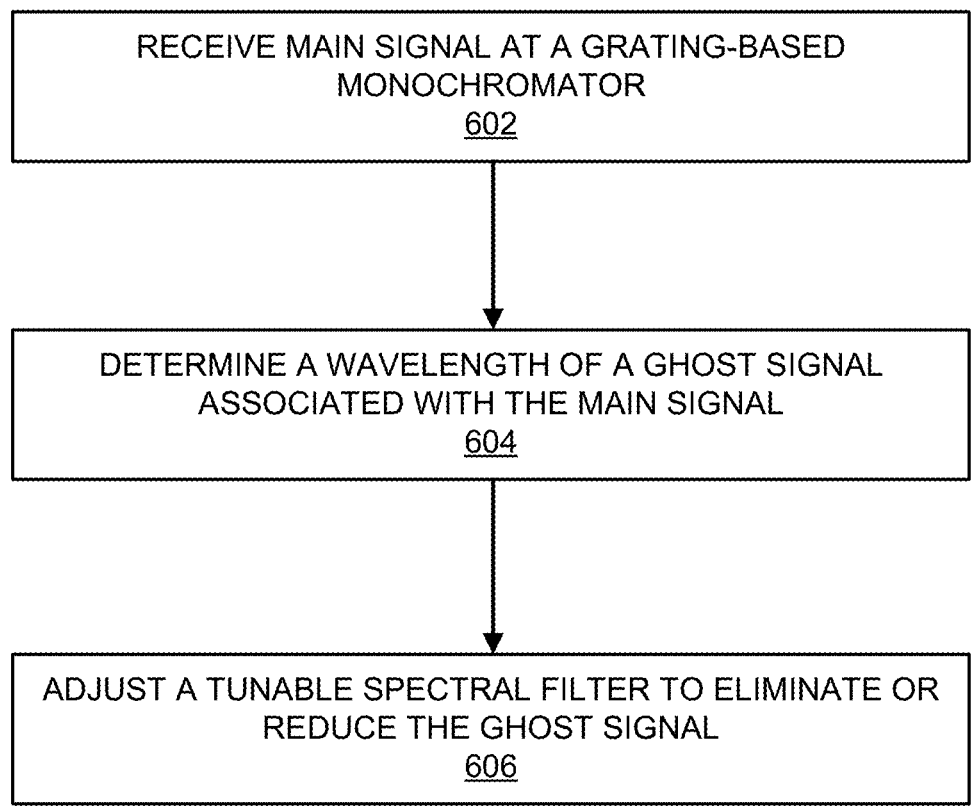
FIG. 6 illustrates a flow chart of a method for reducing or eliminating optical ghosts in an optical spectrum analyzer through a scanning spectral filter, according to an example.

FIG. 6 illustrates a flow chart of a method for reducing or eliminating optical ghosts in an optical spectrum analyzer through a scanning spectral filter, according to an example. The method 600 is provided by way of example, as there may be a variety of ways to carry out the method described herein. Although the method 600 is primarily described as being performed by the configurations of FIGS. 4A-4D, the method 600 may be executed or otherwise performed by one or more processing components of another system or a combination of systems. Each block shown in FIG. 6 may further represent one or more processes, methods, or sub-routines, and one or more of the blocks (e.g., the selection process) may include machine readable instructions stored on a non-transitory computer readable medium and executed by a processor or other type of processing circuit to perform one or more operations described herein.

At block 602, a monochromator based optical spectrum analyzer (e.g., optical measurement system 100) may receive a main signal 208 to be measured through an input/output element 202, for example, from an optical fiber or similar source. The main signal 208 may be provided onto a grating 204 along a first path. The main signal may be diffracted by the grating, reflected back onto the grating by a reflector element 206, and returned to the input/output element by another diffraction. In some examples, multiple paths of diffraction and reflection may be achieved by selecting an angle between the input/output element and the grating, as well as, a position and rotation of the reflector element. As discussed herein, one or more ghost signals may be created and find its/their way back to the input/output element.

At block 604, a wavelength of a ghost signal associated with the main signal may be determined or estimated based on a structure of the grating, an angle and distance between the input/output element, the grating, and the reflector element. Ghost signal wavelengths are typically higher than the main signal wavelength as shown in Table 1.

At block 606, a tunable spectral filter that is part of the monochromator may be adjusted to reduce or eliminate the ghost signal. The tunable spectral filter may be a low-pass filter with a cut-off point set to allow the main signal to pass, but not the ghost signal. The tunable spectral filter may also be a band-pass filter with its pass band adjusted to be around the main signal. IN yet other examples, the tunable spectral filter may be a high-pass filter, which may be activated (placed into the path of the signal) after the main signal is captured, thereby eliminating the source of the ghost signal temporally. The filter may either be linearly scanned across the optical beam, angularly tuned, or introduced in a subsequent portion of the OSA scanning window.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
   a grating element to receive an input optical beam via an input element and diffract the input optical beam;
   a reflector element to receive the diffracted input optical beam from the grating element and reflect the diffracted input optical beam back onto the grating element, wherein the grating element is to diffract the reflected input optical beam and transmit the diffracted reflected input optical beam as an output optical beam to an output element;
   a tunable spectral filter element positioned on a path of the output optical beam to reduce or eliminate a ghost signal beam; and
   a motion element connected to move the tunable spectral filter element to adjust a cut-off point or a band of the tunable spectral filter element based on a wavelength of the input optical beam to allow the output optical beam to pass through the tunable spectral filter element to the output element and prevent the ghost signal beam from passing through the tunable spectral filter element to the output element.

2. The system of claim 1, wherein
   the tunable spectral filter element is a low-pass filter, and
   a cut-off point of the low-pass filter is adjusted based on the wavelength of the input optical beam.

3. The system of claim 1, wherein
   the tunable spectral filter element is a band-pass filter, and
   a pass band of the band-pass filter is adjusted based on the wavelength of the input optical beam.

4. The system of claim 1, wherein
   the tunable spectral filter element is a high-pass filter, and
   a cut-off point of the high-pass filter is adjusted based on the wavelength of the input optical beam.

5. The system of claim 1, further comprising:
   an additional motion element connected to the reflector element,
   wherein the motion element connected to the tunable spectral filter element and the additional motion element connected to the reflector element are coordinated to synchronously move the tunable spectral filter element and the reflector element to allow the output optical beam to pass through the tunable spectral filter element to the output element and prevent the ghost signal beam from passing through the tunable spectral filter element to the output element.

6. The system of claim 1, wherein the motion element is further connected to the reflector element to synchronously move the tunable spectral filter element and the reflector element.

7. The system of claim 6, wherein the motion element is a motor, a micro-electromechanical system (MEMS), or a piezoelectric-based motion element.

8. The system of claim 1, wherein the tunable spectral filter element is further to reduce or eliminate a secondary ghost signal beam created by the grating element.

9. The system of claim 1, wherein the tunable spectral filter element is placed adjacent to or inside the output element.

10. The system of claim 1, further comprising a focus element to focus the output optical beam to the output element.

11. The system of claim 1, wherein the grating element comprises one of a transmission amplitude diffraction grating, a reflection amplitude diffraction grating, a phase diffraction grating, or an optical axis diffraction grating.

12. A method for an optical spectrum analyzer, comprising:
receiving, at a grating element, a main optical beam from an input element to be diffracted by the grating element;
diffracting, by the grating element, the main optical beam onto a reflector element;
reflecting, by the reflector element, the diffracted main optical beam as a reflected main optical beam back to the grating element;
diffracting, by the grating element, the reflected main optical beam from the reflector element, wherein the grating element is to transmit the diffracted reflected main optical beam as an output optical beam toward an output element;
positioning a tunable spectral filter element on a path of the output optical beam to reduce or eliminate a ghost signal beam;
moving, by a motion element, the tunable spectral filter element to adjust a cut-off point or a band of the tunable spectral filter element based on a wavelength of the main optical beam to allow the output optical beam to pass through the tunable spectral filter element to the output element and prevent the ghost signal beam from passing to the output element; and
transmitting, by the grating element, the diffracted reflected main optical beam as the output optical beam to the output element via the tunable spectral filter element.

13. The method of claim 12, wherein the tunable spectral filter element is a low-pass filter, and the method further comprises:
adjusting a cut-off point of the low-pass filter based on the wavelength of the main optical beam.

14. The method of claim 12, wherein the tunable spectral filter element is a band-pass filter, and the method further comprises:
adjusting a pass band of the band-pass filter based on the wavelength of the main optical beam.

15. The method of claim 12, wherein the tunable spectral filter element is a high-pass filter, and the method further comprises:
adjusting a cut-off point of the high-pass filter based on the wavelength of the main optical beam.

16. The method of claim 12, further comprising:
synchronously moving the tunable spectral filter element and the reflector element by coordinating the motion element connected to the tunable spectral filter element and an additional motion element connected to the reflector element.

17. An optical spectrum analyzer (OSA), comprising:
an optical pre-processing block comprising:
an input element;
an output element;
a grating element to receive an input optical beam via the input element and diffract the optical beam;
a reflector element to receive the diffracted input optical beam from the grating element and reflect the diffracted input optical beam back onto the grating element,
wherein the grating element is to diffract the reflected input optical beam and transmit the diffracted reflected input optical beam as an output optical beam toward the output element;
a tunable spectral filter element positioned on a path of the output optical beam to reduce or eliminate a ghost signal beam; and
a motion element connected to move the tunable spectral filter element to adjust a cut-off point or a band of the tunable spectral filter element based on a wavelength of the input optical beam to allow the output optical beam to pass through the tunable spectral filter element to the output element and prevent the ghost signal beam from passing to the output element.

18. The OSA of claim 17, wherein
the tunable spectral filter element is a low-pass filter, and a cut-off point of the low-pass filter is adjusted based on the wavelength of the input optical beam; or
the tunable spectral filter element is a band-pass filter, and a pass band of the band-pass filter is adjusted based on the wavelength of the input optical beam; or
the tunable spectral filter element is a high-pass filter, and a cut-off point of the high-pass filter is adjusted based on the wavelength of the input optical beam.

19. The OSA of claim 17, further comprising:
an additional motion element connected to the reflector element,
wherein the motion element connected to the tunable spectral filter element and the additional motion element connected to the reflector element are coordinated to synchronously move the tunable spectral filter element and the reflector element to allow the output optical beam to pass through the tunable spectral filter element to the output element and prevent the ghost signal beam from passing through the tunable spectral filter element to the output element.

20. The OSA of claim 17, wherein the motion element is further connected to the reflector element to synchronously move the tunable spectral filter element and the reflector element.

* * * * *